Oct. 27, 1964  P. B. SHAFFER  3,154,708
STATOR FOR USE IN AN ALTERNATING CURRENT INDUCTION MOTOR
Filed April 25, 1963  2 Sheets-Sheet 1

INVENTOR.
Paul B. Shaffer,
by John M. Stoudt
Attorney.

Oct. 27, 1964 P. B. SHAFFER 3,154,708
STATOR FOR USE IN AN ALTERNATING CURRENT INDUCTION MOTOR
Filed April 25, 1963 2 Sheets-Sheet 2
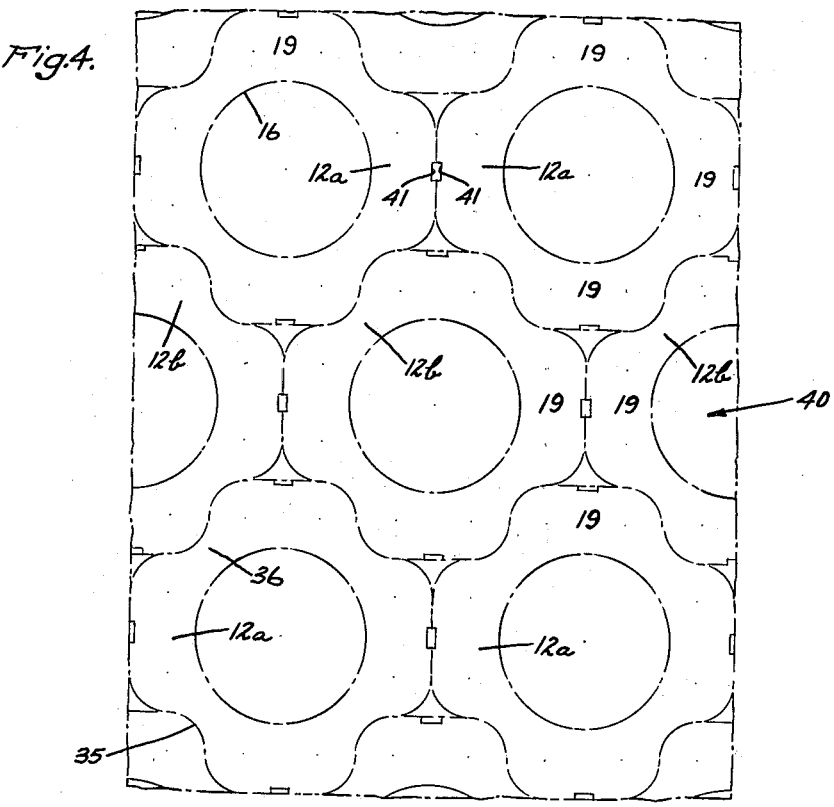
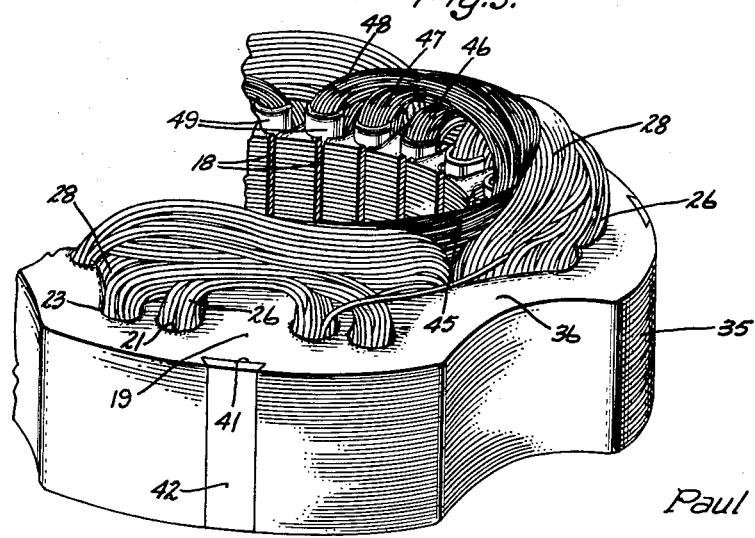
INVENTOR.
Paul B. Shaffer,
by John M. Stoudt
Attorney.

United States Patent Office 3,154,708
Patented Oct. 27, 1964

3,154,708
STATOR FOR USE IN AN ALTERNATING
CURRENT INDUCTION MOTOR
Paul B. Shaffer, De Kalb, Ill., assignor to General Electric
Company, a corporation of New York
Filed Apr. 25, 1963, Ser. No. 275,703
9 Claims. (Cl. 310—187)

This invention relates generally to dynamoelectric machines, and in particular to an improved stator construction for use in a single phase alternating current induction electric motor of the split phase type.

In the usual construction of dynamoelectric machines, a stator is provided with a magnetic core formed of a number of laminations secured together in stacked relation. The core normally includes a plurality of equispaced similar slots disposed around a rotor receiving bore. With specific reference to motors of the single phase, alternating current split-phase type, the stator has a main winding formed by a number of coils customarily located in the slots away from the bore. An auxiliary winding, electrically displaced in the slots from the main winding adjacent the bore, is normally wound of smaller size wire than the main winding in order to attain the necessary current phase displacement between windings.

In one conventional arrangement, such as that illustrated in U.S. Patent No. 2,465,820, Sharrow et al., each winding normally includes concentric coil groups which form primary operating poles on the core with at least the end turns of the outermost coil of each group, which project axially beyond each side face of the core, having an unusually large effective mean length. The effective mean length ($L_m$) of the end turn is the well known terminology used to define the summation of the individual wire lengths of a given winding or coil end turn $$(\Sigma L_1 + L_2 + \ldots L_n)$$

measured from the point of egress of each wire from the core slot carrying one of the coil sides to the point of ingress at the core slot accommodating the other coil side, the sum being divided by the total number of wire turns ($t_n$) contained by the winding or coil end turn under consideration. Expressed algebraically, $$L_m = \Sigma L_1 + L_2 + \ldots L_n)/t_n$$

A short effective mean length is desirable since less conductor material is required for the coil and a reduction is permitted in conductor material and labor costs, in winding ressitance, and in end turn leakage reactance. Consequently, generally speaking, a short effective mean length of the main winding coils in a single phase motor will result in a high attainable output for any given core stack length.

In conventional stator core construction, such as that illustrated in the aforementioned Sharrow et al. patent, there has also been a problem in providing adequate space for the end turns of the auxiliary winding in spite of the fact that this latter winding is customarily formed of smaller size wire than the main winding. The winding end turns of the main winding, being bulky, have a tendency to press the auxiliary winding end turns toward the bore where the end turns could interfere with the freedom of rotation of the rotor relative to the stator, producing an intolerable situation.

It will be appreciated from the foregoing that it is extremely desirable to provide an improved stator construction for use in alternating current split phase induction motors which provides an increase in possible output for a given stack length over conventional structures and does so while maintaining economy in the mass production manufacture or even effecting a cost reduction in such manufacture. It is further desirable that this be accomplished by a reduction in the amount of conductor material employed for the main winding and achieving a mean effective length for the end turns of at least the outermost coils in the coil group of the main winding. In addition, the foregoing should be achieved without adversely affecting the placement of the windings in the core slots and, if possible, permit further economies in the effective use and manufacture of the magnetic material for the stator core.

Accordingly, it is a general object of the present invention to provide an improved stator construction to use in a dynamoelectric machine and a more specific object is the provision of an improved stator especially suitable for use in a single phase alternating current split phase type induction electric motor.

Another object of the invention is the provision of an improved stator construction suitable for use in a single phase alternating current induction type motor employing a winding which includes the desirable features mentioned above.

It is a further object of the invention to provide an improved stator construction having concentric coil groups in a main winding which has a short effective mean length of the winding end turns for at least the outermost coils thereof.

It is still a further object of the present invention to provide an improved stator core which is economical to manufacture in mass production quantities yet provides improved performance for the motor in which it is employed.

Another object of the invention is the provision of an improved lamination which affords a saving of stock material in its fabrication.

In carrying out the objects in one form, I provide an improved stator especially for use in a single phase alternating current induction type motor in which the core includes a yoke section and a plurality of angularly spaced apart elongated winding slots extending inwardly from the yoke section which terminate in entrances at a rotor receiving bore. The slots are arranged in a number of slot groups defining polar regions and carry coil groups of a main winding which in turn form a plurality of primary poles. The outermost coil of each coil group is arranged in the outermost elongated slot, preferably each slot of the group converging toward the radial center of its polar region away from the bore. That is to say, the center of the upper slot end located next to the yoke section should be linearly nearer to the radial polar center than is the center of the slot entrance of the same slot. In order to obtain the best results of my invention, the slot arrangement should be such that the outermost elongated slot should have the center of its upper end angularly nearer to the polar center than is the center of the slot entrance for the adjacent slot toward the polar center in the same slot group.

In this way, it is possible to provide an extremely short effective mean length for the main winding end turns, resulting in a low reactance loss of the end turns, reduction in conductor resistance, and at the same time effecting a saving in the amount of conductor material employed. Moreover, the coil end turns of the main winding have a natural tendency to form away from the stator bore, leaving adequate space for accommodating the end turns of the auxiliary winding radially outward from the stator bore. In addition, among other advantages, a savings in magnetic material may also be achieved since it is possible to provide a scalloped core configuration in which the polar regions have a greater dimensional radial depth than the radial depth of the core intermediate the outermost elongated slots of adjacent slot groups. Thus, laminations may be punched out of a single sheet of magnetic stock material in a nested or staggered relation.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

Figure 1:
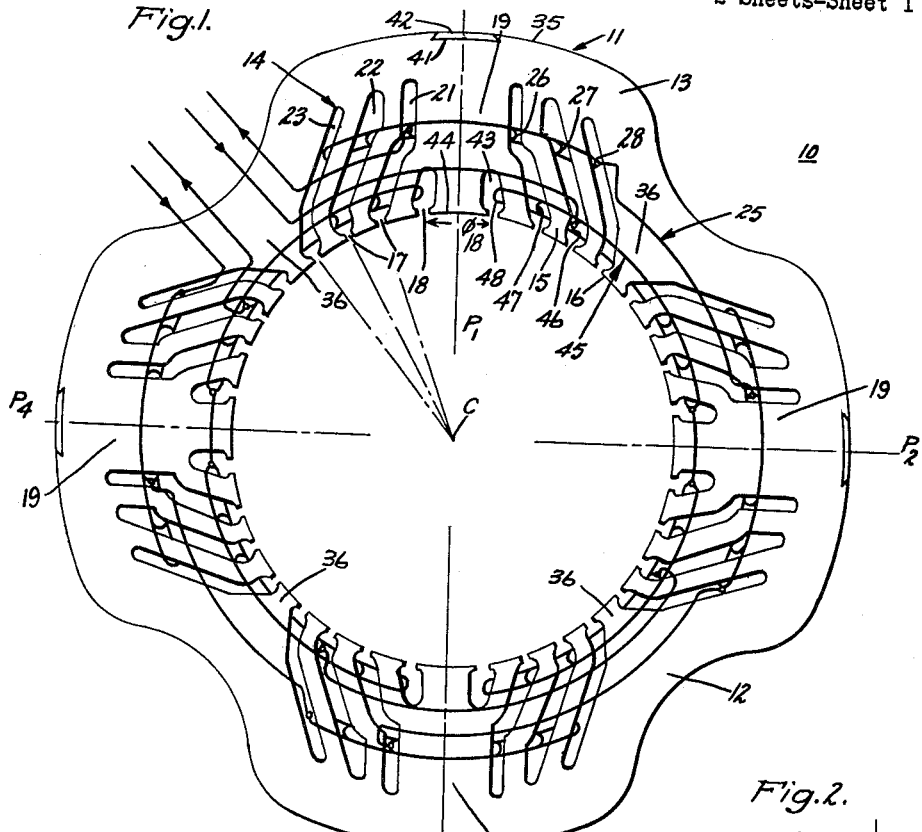
FIG. 1 is a front view of a stator embodying one form of the present invention, with concentric main and auxiliary windings schematically illustrated on the stator to show more clearly the magnetic polar regions and slot groups of the core.
Figure 3:
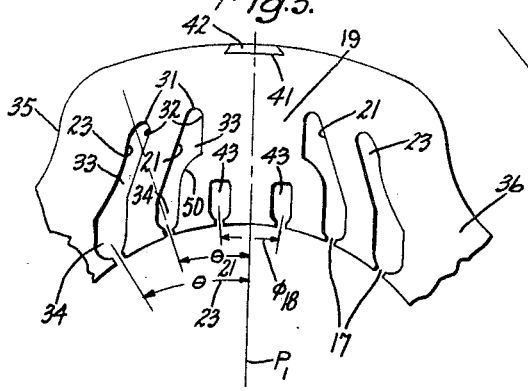
FIG. 3 is an enlarged fragmentary view of a stator core showing a modification of the slot groups.

FIG. 4 is a plan view of a lamination arrangement for the cores of FIGS. 1 and 3 by which they may be inexpensively severed from a sheet of magnetic material, the laminations being shown by broken lines in nesting or staggered relation; and FIG. 5 is a partial view in perspective of the stator core of FIG. 3, revealing the manner in which the slot groups accommodate the coils of the windings to provide the desirable low mean effective length of certain winding end turns.

Referring now to the drawings in more detail and in particular to FIG. 1, for purposes of explanation and disclosure, one form of the invention has been illustrated in connection with a stator 10 for use in a single phase alternating current induction resistance split phase type electric motor designed for four pole operation. The motor also includes a conventional rotor provided with a squirrel-cage winding (not shown). More specifically, as seen in the embodiment revealed by FIG. 1, the stator includes a laminated core 11 formed of a predetermined number of identical stacked laminations 12 punched or stamped from a sheet of suitable magnetic material.

For convenience and simplicity of disclosure, the same designations will be used hereinafter to identify the components of the individual laminations and the corresponding core structure they form when the laminations are in stacked relation. Each lamination includes perforations and recesses which, when aligned, form the core now to be described. Still referring to FIG. 1, core 11 includes an outer yoke section 13 and elongated winding accommodating slots 14 extending inwardly therefrom, with teeth sections 15 disposed therebetween forming a cylindrical rotor receiving bore 16. Each slot terminates in an opening or entrance 17 at the bore with the entrance being generally radial with respect to longitudinal axis of the bore indicated by letter "C". Since the stator of the exemplification provides four pole operation, these slots are divided into four identical slot groups which in turn define four similar main polar regions 19 having radial centers denoted by broken lines $P_1$, $P_2$, $P_3$ and $P_4$ respectively. For the illustrated four pole stator, each polar region is therefore equivalent to a quadrature of the core.

Each slot group comprises three pairs of elongated slots, successive pairs of slots being indicated by numerals 21, 22, and 23 (innermost and outermost), with the pairs being symmetrically disposed about the radial polar center, that is, one slot of each pair is symmetrically provided on either side of the radial polar center.

A main winding 25 is accommodated by the slots and insulated therefrom by a thin covering or layer 24 (FIG. 2) of insulating material disposed over the slot walls and core sides to prevent grounding of the winding.

The layer may be applied on the core in any suitable manner, as by a fluidized bed process. As shown in FIG. 1 the winding comprises four groups of three interconnected concentric coils 26, 27, and 28, respectively arranged in slots 21, 22, and 23 to provide four main primary operating poles having a center coincident with that of the polar regions. To provide as close to a sinusoidal flux wave form for the flux distribution as possible, the coils should include a differing number of turns of magnet wire conductors, the precise number of turns being dependent upon the electrical displacement of the coil from $P_1$ and the type and size of the motor involved. These principles are well known and will not be further discussed. In view of the quadrature symmetry of the stator of the exemplification, only one of the polar regions, $P_1$, and operating poles will be described in detail.

Figure 2:
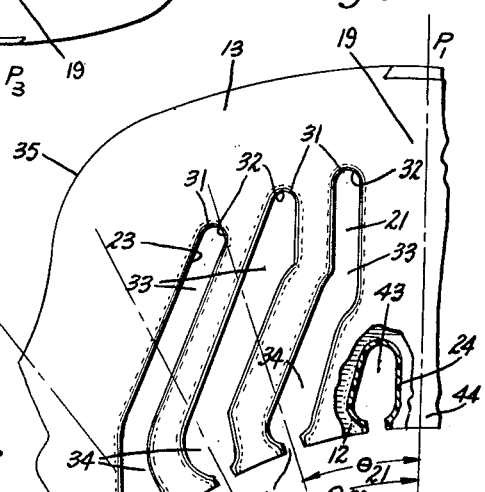
FIG. 2 is an enlarged fragmentary view of one of the magnetic polar regions of the stator core seen in FIG. 1 to illustrate details.

Turning now to the illustrated configuration of elongated slots 21, 22, and 23 associated with $P_1$ and in particular to FIGS. 1 and 2, it will be seen that each elongated slot converges toward the upper part of radial center $P_1$, away from the bore. That is to say that the slot has the center 31 of its uppermost end wall 32, which is located next to yoke section 13, linearly nearer to radial center $P_1$ than is the center of its entrance 17 disposed at the bore. In this way it is possible to obtain an extremely short effective mean length for the winding end turns of the coils carried by the slot having such construction.

I have found that in order to derive the maximum benefits from my invention with respect to the attainment of the most desirable effective mean length possible for the main winding end turns, at least the outermost elongated slot 23 of the slot group, and preferably, as shown in the exemplification of FIGS. 1 and 2, slot 22 should converge toward $P_1$ such that center 31 of the particular slot wall should be provided angularly nearer to $P_1$ than is the center of the slot entrance for the adjacent slot in the same slot group. In FIG. 2, the angular distances of the slot entrance centers from $P_1$ are denoted by $\theta_{21}$, $\theta_{22}$, and $\theta_{23}$ respectively for slots 21, 22, and 23. In addition, preferably the total length of the slot is at least three times its width adjacent end wall 32. In other words, upper slot center 31 for slot 23 extends angularly beyond entrance $\theta_{22}$ for slot 22 in the direction of radial center $P_1$. I also prefer that upper slot portion 33 of at least outermost slot 23 has a greater over-all slope toward $P_1$ than the lower slot portion 34 located next to slot entrance 17 for that slot. This relationship permits ease in the installation of pre-formed coils into the slot through entrance 17 from bore 16.

It will be appreciated that with the use of my invention, the volume of conductors in the winding end turns for the main winding coils, e.g. coil 28, is greatly reduced over that permitted by any of the prior arrangements known to me. This reduction, in turn, provides reduced coil resistance and achieves unusually low reactance losses at the end turns. Consequently, I am able to realize improved performance for any given stack length over prior art stators, or for a given performance, the stator built with my invention may be axially shortened. A savings in winding conductor material as well as labor is also obtained due to the overall shortening of the winding end turns.

Another feature of the present invention is the possible economy in the fabrication of the magnetic core itself without detrimentally affecting the material available for the flux. In this regard, it should be observed from the drawings that the laminations 12 of core 11 each include a generally scalloped outer peripheral configuration 35. In particular, the greatest radial depth of the lamination is located at each radial center P of the polar region 19 and the minimum radial depth is disposed in the region 36 disposed intermediate the elongated slots of adjacent slot groups.

As shown in FIG. 4, the laminations can be severed in nested relation, that is in parallel but staggered rows, from a single magnetic sheet of stock material, indicated at 40. For example, the greater depths of magnetic polar regions 19 of laminations 12a nest between and are contiguous to the less deep intermediate regions 36 of adjacent laminations 12b. The center of the laminations may be stamped into rotor laminations in the usual way. The laminations are progressively punched out along the illustrated broken lines (peripheries 35) with the slot arrangement seen in FIGS. 1 and 2 which for simplicity of illustration, are not shown in FIG. 4. Moreover, notches 41 may be conveniently provided in periphery 35 at the center of each polar region 19 for frictionally engaging securing keys 42 (FIG. 1) which they accommodate to secure the laminations 12 together into a rigid core. Thus, a saving in material and use of the highly desirable, well known, progressive die technique are possible.

My invention provides advantages in addition to those already explained. For instance, an auxiliary or start winding 45 may be conveniently arranged in the stator, displaced from the main winding 25 at the optimum ninety electrical degree position. In particular, unlike prior art stators, the elongated slots effect a natural tendency of the main winding end turns to "lay away" from the rotor bore. This is clearly revealed in FIG. 5 which will be discussed in connection with the embodiment of FIG. 3. Consequently, the main winding will not force the auxiliary winding end turns toward the bore where they could interfere with rotation of the rotor. Moreover, a radially shallow slot 43, having an entrance 18 at the bore 16, may be symmetrically furnished in polar regions 19, one on either side of the radial centers P, without adversely affecting the magnetic material or flux path required for the main winding operating poles. As shown, tooth 44 or the angular distance $\theta_{18}$ between entrances 18 of slots 43 is approximately twice that between adjacent entrances 17 which are equally spaced, one from the other.

In the illustrated embodiment of FIG. 1, auxiliary winding 45 comprises four coil groups in which each coil group includes three coils 46, 47, and 48 (innermost or outermost) concentrically disposed at region 36 and suitably connected to a power source of energization. Like the main winding, the coils are wound with a pre-selected number of wire turns to approximate a sinusoidal flux distribution wave form. The outermost coil 48 which normally contains the greatest number of turns, is thus accommodated in shallow slot 43 which carries only that coil. A conventional wedge 49 (FIG. 5) may be used to close each slot entrance in the usual way.

The following example is given in order to illustrate more clearly how the present invention, as described above, has been carried out in actual practice in a single phase alternating current resistance split phase induction type motor, incorporating a stator 10, such as that shown in FIGS. 1 and 2. The stator incorporated a main winding 25 composed of 0.048 inch diameter aluminum magnet wire for coils 26, 27, and 28 respectively formed with twenty, twenty-seven, and twenty-nine wire turns. The auxiliary winding was composed of 0.0226 inch diameter copper magnet wire and its coils 46, 47, 48 included sixteen, twenty-five and eighteen turns respectively.

With respect to the dimensions of stator core 11, it was formed of common iron laminations as follows:

| Stack Axial Length, inches | Maximum diameter of core across P of region 19, inches | Minimum diameter at region 36, inches | Bore 16, inches |
|---|---|---|---|
| 1.33 | 6.25 | 5.16 | 3.5 |

| Slot Identity | 21 | 22 | 23 | 43 |
|---|---|---|---|---|
| Winding Accommodating slot area in sq. inches | 0.097 | 0.118 | 0.100 | 0.034 |

When tested, this motor produced a breakdown torque of 47.9 oz. ft. at approximately 1430 r.p.m.; a slip torque of 32.5 oz. ft.; and a standstill or locked rotor torque of 41.1 oz. ft. Consequently, it will be appreciated that in spite of the savings permissible with the use of my invention, excellent output performance can be attained.

FIGS. 3 and 5 show a second embodiment of the present invention, which will be described using like numerals for like parts. In this embodiment, the polar region includes two pairs of symmetrically disposed elongated slots 21, 23 to carry the sides of a main winding having only two concentric coils 26, 28 per coil group. Slot 21 differs principally from slot 21 of the first embodiment shown by FIGS. 1 and 2 in that it has a larger area at slot portion 33 adjacent upper end 32 to accommodate more wire turns than that required in the first embodiment since two, rather than three, pairs of elongated slots are included in each slot group. The enlarged area also compensates for the convex side 50 which permits the use of a somewhat rectangular shape for the radially shallow slot 43. Angular distance $\phi_{18}$ between shallow slot entrances 18 is equal to that between adjacent slot entrances 17 in this embodiment. Although the outer side of slot 23 is convex and conforms generally to periphery 35 in configuration, slot portion 33 still slopes generally toward $P_1$ as does that for slot 21 in the manner already outlined for FIGS. 1 and 2. In all other respects, polar region 19 is similar to that already discussed in the first embodiment.

With regard to FIG. 5, it will be observed that a stator employing the core partially shown in FIG. 3 incorporates the same desirable features and advantages previously described with respect to the embodiment of FIGS. 1 and 2. All the coils of the main winding include a short effective mean length for the end turns which tend to lay away from bore 16. There is provided ample end turn space for the auxiliary winding coils 46, 47, and 48 and shallow slot 43 does not interfere with the magnetic flux path for the main winding operating poles in polar region 19. Moreover, the same winding and core economies exist while improved performance is provided.

While in accordance with the patent statutes, I have described what at present is considered to be the preferred embodiments of my invention, it will be obvious to those skilled in the art that numerous changes and modifications may be made therein without departing from the invention. It is therefore aimed in the appended claims to cover all such equivalent variations as fall within the true spirit and scope of the invention.

What I claim as new and desire to secure by Letters Patent of the United States is:

1. For use in a single phase alternating current induction type electric motor, a stator having a core formed of magnetic material, said core comprising a yoke section, a bore, and having at least a plurality of angularly spaced apart elongated winding accommodating slots extending inwardly from said yoke section and terminating in slot entrances at said bore, said slots being arranged in a plurality of slot groups defining a number of polar regions, and a main winding including a number of coil groups arranged in said slots forming a plurality of primary poles, the outermost coil of each coil group being arranged in the outermost elongated slot of each slot group, each of said main winding accommodating slots in each of said slot groups converging toward the radial center of its polar region away from said bore with the center of the slot end located adjacent said yoke section being linearly nearer to said radial polar center than is the center of the slot entrance for the same slot.

2. For use in a single phase alternating current induction type electric motor, a stator core formed of magnetic material comprising a yoke section, and a plurality of angularly spaced apart elongated winding accommodating slots extending inwardly from said yoke section, said slots being arranged in a plurality of slot groups defining a number of polar regions, and a winding including a number of coil groups aranged in said slots forming a plurality of primary poles, the outermost coil of each coil group being arranged in the outermost slot of each slot group, at least the outermost slot of each slot group converging toward the radial center of the polar region with the center of the slot end adjacent said yoke section being linearly nearer to said radial polar center than is the center of its opposite end.

3. For use in a single phase alternating current split phase induction type electric motor, a stator core formed of magnetic material comprising a yoke section, a rotor receiving bore, and a plurality of angularly spaced apart winding accommodating slots extending inwardly from said yoke section and terminating in slot entrances at said bore, said slots being arranged in a plurality of slot groups defining polar regions, said groups each having at least two elongated slots positioned on either side of the radial center of its polar region, the outer peripheral surface of said core including a generally scalloped configuration, with the radial depth of the core adjacent the center of the polar region of each slot group being dimensionally greater than the radial depth of the core intermediate the outermost slots of adjacent slot groups, said elongated slots having the center of its end disposed adjacent said yoke section linearly closer to the radial center of the associated polar region than is the center of the slot entrance for the same slot.

4. For use in a single phase alternating current split phase induction type electric motor, a stator having a core formed of magnetic material comprising a yoke section, a rotor receiving bore, and a plurality of angularly spaced apart winding accommodating slots extending inwardly from said yoke section and terminating in slot entrances at said bore, said slots being arranged in a plurality of slot groups defining polar regions, said groups each having at least two elongated slots positioned on either side of the radial center of its polar region, at least the outermost elongated slot in each slot group having the center of its end disposed adjacent said yoke section disposed angularly nearer to its polar radial center than the center of the slot entrance for the adjacent slot in the same slot group.

5. For use in a single phase alternating current split phase induction type electric motor, a stator having a core formed of magnetic material comprising a yoke section, a rotor receiving bore, and a plurality of angularly spaced apart elongated winding accommodating slots extending inwardly from said yoke section and terminating in slot entrances at said bore, said slots being arranged in a plurality of slot groups defining polar regions, the outer peripheral surface of said core having a generally scalloped configuration, with the radial depth of the core at the center of the respective polar regions being dimensionally greater than the radial depth of the core intermediate the outermost slots of adjacent slot groups, at least the outermost slot of each slot group having the center of its end disposed adjacent said yoke section arranged angularly nearer to said radial polar center for its slot group than is the center of the slot entrance for the adjacent slot in the same slot group.

6. For use in a single phase alternating current induction type electric motor, a stator having a laminated core formed of a number of laminations of magnetic material in stacked relation comprising a yoke section, a rotor receiving bore, and a plurality of angularly spaced apart elongated winding accommodating slots extending inwardly from said yoke section and terminating in slot entrances at said bore, said slots being arranged in identical slot groups defining polar regions and having at least several slots located on either side of the radial center of each of said regions, at least one radially shallow slot located adjacent said radial polar center, a main winding having groups of coils arranged in the slots, all of said elongated slots converging away from said bore toward said radial polar center, an auxiliary winding having coil groups electrically displaced in the slots from said main winding, with the outermost coil of each auxiliary winding coil group being accommodated by said shallow slots whereby a low effective mean length of winding end turn for the coils in said main winding is permitted.

7. For use in a single phase alternating current split phase induction type electric motor, a stator having a laminated core formed of a number of laminations of magnetic material in stacked relation comprising a yoke section, a rotor receiving bore disposed inwardly of said yoke section, and a plurality of angularly spaced apart elongated winding accommodating slots extending inwardly from said yoke section and terminating in slot entrances at said bore, said elongated slots being arranged in four identical slot groups defining four polar regions with said slots being symmetrically spaced around the radial centers of said regions, each of said slots converging toward the radial center of said regions away from said bore, at least one radially shallow slot positioned on either side of the radial center for each polar region, a main winding having four concentric groups of coils arranged in said elongated slots with the outermost coil of each coil group accommodated by the outermost elongated slot of each slot group to form four primary poles, and an auxiliary winding formed by four concentric coil groups electrically displaced in the slots from said main winding with the outermost coil in each auxiliary winding coil group being disposed in said shallow slots, whereby a low effectve mean length of the main winding end turns and adequate space for the auxiliary winding end turns are provided.

8. A lamination for use in a stator core of a single phase alternating current induction type electric motor comprising a yoke section, a bore disposed inwardly of said section and a plurality of angularly spaced apart elongated slots each extending inwardly from an upper slot end at said yoke section to an entrance at said bore, said slots being arranged in a plurality of slot groups defining polar regions, the center of the upper ends of said slots being linearly closer to the center of their respective polar regions than are the centers of their respective slot entrances, the outer peripheral surface of said lamination including a generally scalloped shape with the radial depth at the center of each polar region being dimensionally greater than the radial depth of the lamination intermediate the outermost slots of adjacent slot groups whereby a number of said laminations may be severed in nested relation from a sheet of magnetic material.

9. A lamination for use in a stator core of a single phase alternating current induction type electric motor comprising a yoke section, a bore disposed inwardly of said section and a plurality of angularly spaced apart elongated slots each extending inwardly from said yoke section and terminating in a slot entrance at said bore, said slots being arranged in a plurality of slot groups defining polar regions with at least the outermost slot in each group converging away from said bore toward the center of its associated polar region, the outer peripheral surface of said lamination including a generally scalloped configuration with the radial depth at the center of each polar region being dimensionally greater than the radial depth of the lamination intermediate the outermost slots of adjacent slot groups whereby a number of said laminations may be severed in nested relation from a single sheet of magnetic material.

References Cited in the file of this patent

UNITED STATES PATENTS

| 1,723,912 | Bergman | Aug. 6, 1929 |
| 2,473,257 | Potter | June 14, 1949 |
| 2,795,712 | Suhr | June 11, 1957 |
| 2,845,553 | Oldenkamp et al. | July 29, 1958 |